March 15, 1927. Re. 16,572

W. E. WHITE

SLEEPER ANCHOR

Original Filed Dec. 12, 1921

Witness:
G. C. Barnes

Inventor
William E. White,
By Chas. J. Murray Atty.

Reissued Mar. 15, 1927. Re. 16,572

UNITED STATES PATENT OFFICE.

WILLIAM E. WHITE, OF CHICAGO, ILLINOIS, ASSIGNOR TO KALMAN STEEL CO., OF CHICAGO, ILLINOIS, A CORPORATION OF DELAWARE.

SLEEPER ANCHOR.

Original No. 1,496,504, dated June 3, 1924, Serial No. 521,600, filed December 12, 1921. Application for reissue filed June 5, 1925. Serial No. 35,241.

My invention relates to devices intended for use in connection with the attachment of flooring to concrete slabs and particularly to a simple improvement on devices of this character as heretofore employed.

One of the objects of my invention is to simplify the manufacture and use of devices of the character described. In the anchor of my invention, I utilize two easily formed elements, one of wire and the other of sheet metal, the former acting as the anchoring means and the latter as the fastening means for a sleeper. In the specific embodiment of the invention herein shown, I provide a closed loop of wire, the terminal portions of which are laterally bent in the same direction, and a sheet metal strip of U-shape adapted to co-operate with and provide a seat for the intermediate portion of the loop. A device of this character can be very economically made and assembled.

Figure 1:
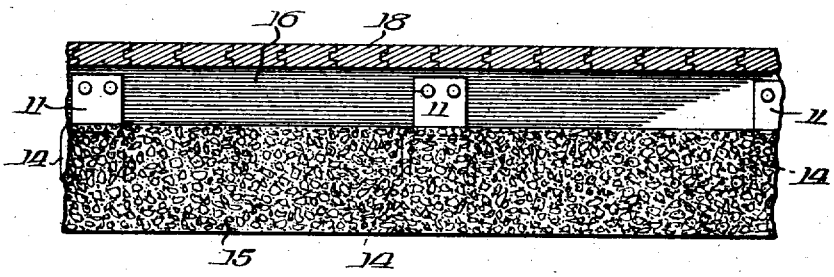
Figure 2:
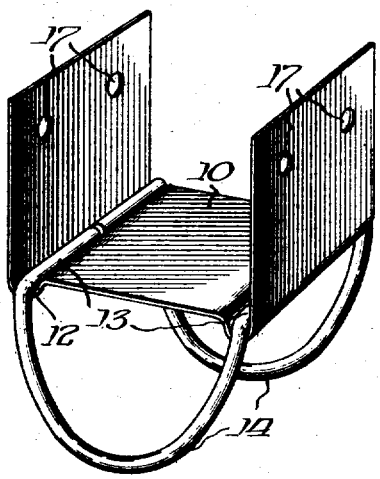
Figure 3:
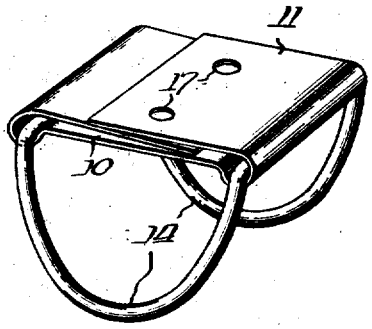

The invention will be more readily understood by reference to the accompanying drawing, wherein, Fig. 1 is a view partly in section and partly in elevation, showing the manner of use of the device of my invention, Fig. 2 is an enlarged perspective view showing the fastening clips in their operative position, and Fig. 3 is a similar view showing the clips in folded or shipping position.

In the drawings it will be seen that the device of my invention comprises a strip of metal of U-shape, having a base, 10 and upstanding wings, 11, transverse seats 12, being provided at the angle of the parts 10, 11. The seats serve to accommodate the intermediate portions 13 of a closed wire loop, the ends 14, of which are laterally bent into parallelism and constitute anchors adapted to be embedded in a slab, 15 of concrete.

When the device is manufactured the wings, 11 are bent downwardly and overlapped, as shown in Fig. 3, and the device is installed with the parts in this position. When the concrete has set and the loops 14 are suitably anchored therein, the wings, 11, are bent upward into the position of Fig. 2, and are adapted to engage a sleeper, 16 between them, nails or other fastening devices being inserted through the opening 17 in the wings. The flooring 18 may then be laid on the sleepers in the usual manner.

The anchoring device is of very simple construction and of light weight, the wire anchoring elements possessing relatively great strength in proportion to the weight of material employed. The inter-engaging portions of the wire and strip being shaped as shown, a flat surface is provided for the accommodation of the wooden sleeper.

One of the particular points of advantage is that by reason of the shape of the anchoring elements they may be very readily caused to enter the plastic concrete and to divert or deflect any stones imbedded therein which would otherwise interfere with the insertion of an anchor of this sort. A further advantage is that when imbedded in the concrete there are no lines of cleavage such as occur in the use of flat imperforate anchoring projections.

It is obvious that the device may be modified in many particulars without departure from the spirit of my invention and I do not wish to be limited except as indicated in the appended claims.

I claim:

1. In a sleeper anchor, the combination of a section of sheet metal of generally U-shape when in one position of use, and an anchoring device consisting of a single length of wire bent into the form of an elongated closed loop the ends bent at right angles in parallelism, the straight portions intervening between the bent ends lying at the corners of the U-shaped portion of sheet metal.

2. In an anchoring device, the combination of a strip of flexible sheet metal bent into generally U-shape and having grooves at the angles of bend, and an anchor consisting of a length of wire formed into a closed loop, the end portions of the loop being bent at right angles into substantial parallelism, the intervening straight portions lying in said grooves, the legs of the U-shaped sheet metal portion being adapted to be folded down to confine the anchor prior to and during installation and to be bent upward into parallelism after the anchor portions have been encased in the hardened plastic material.

3. In a sleeper anchor, the combination of an anchor element providing a pair of depending portions adapted to enter the concrete, members connecting said portions and adapted to lie on the concrete, and a sheet metal wing, connected to and adapted for pivotal movement around each said connecting member, said wings adapted to lie flat on the concrete or to swing into a position perpendicular thereto and to occupy vertical planes at right angles to the planes of the depending portions.

4. In a device of the class described, the combination of a pair of anchor elements, rods connecting the same, wings connected to and adapted for pivotal movement around said rods, said wings being adapted to be disposed in a position flat on the surrounding surface or perpendicular thereto in vertical planes at right angles to the planes of the anchor elements in order to provide means of attachment to a sleeper.

5. In a device of the class described, the combination of a single wire bent to provide a pair of V-shaped anchor elements, connecting wires between the upper ends of respective elements, and sheet metal wings having their inner end portions crimped around said connecting wires and adapted for pivotal movement around said wires.

6. In a device of the class described, the combination of a single wire bent to provide a pair of V-shaped anchor elements, horizontal wires connecting said elements, and wings connected to and adapted for pivotal movement around said connecting wires and adapted to lie in a vertical plane at right angles to the vertical plane of the anchor elements.

7. In a sleeper anchor, the combination of a pair of depending portions adapted to enter the concrete, rods connecting said portions and extending transversely of the vertical plane of said portions, and a wing connected to each of said rods and adapted for pivotal movement therearound, said wings being adapted to lie flat on the concrete or to swing into a position perpendicular thereto and to occupy vertical planes at right angles to the planes of the depending portions.

In testimony whereof, I have hereunto affixed my signature, this 1st day of June, 1925.

WILLIAM E. WHITE.